United States Patent
Khatri et al.

(10) Patent No.: US 7,783,919 B2
(45) Date of Patent: Aug. 24, 2010

(54) SYSTEM AND METHOD OF IDENTIFYING AND STORING MEMORY ERROR LOCATIONS

(75) Inventors: Mukund P. Khatri, Austin, TX (US); Michael D. Shepherd, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 446 days.

(21) Appl. No.: 11/854,034

(22) Filed: Sep. 12, 2007

(65) Prior Publication Data
US 2009/0070630 A1  Mar. 12, 2009

(51) Int. Cl.
*G06F 11/00* (2006.01)
(52) U.S. Cl. ............................................................. 714/8
(58) Field of Classification Search ............ 714/2–8, 714/13, 15, 16, 25, 26, 30, 37, 42, 48
See application file for complete search history.

(56) References Cited

U.S. PATENT DOCUMENTS

| | | | | |
|---|---|---|---|---|
| 5,588,112 A | * | 12/1996 | Dearth et al. ................... 714/9 |
| 5,612,965 A | * | 3/1997 | Michaelson .................. 714/800 |
| 6,085,334 A | * | 7/2000 | Giles et al. ...................... 714/7 |
| 7,155,370 B2 | * | 12/2006 | Nejedlo ....................... 702/186 |
| 7,260,758 B1 | * | 8/2007 | Agrawal et al. ............. 714/733 |
| 7,287,204 B2 | * | 10/2007 | Mayer et al. ................ 714/719 |
| 7,428,687 B2 | * | 9/2008 | Klein .......................... 714/754 |
| 2003/0226090 A1 | * | 12/2003 | Thayer ........................ 714/763 |
| 2004/0186688 A1 | * | 9/2004 | Nejedlo ....................... 702/186 |

* cited by examiner

*Primary Examiner*—Nadeem Iqbal
(74) *Attorney, Agent, or Firm*—Larson Newman & Abel, LLP

(57) ABSTRACT

A system and method of identifying and storing memory error locations is disclosed. In one form, a method of using a memory is disclosed. The method can include detecting a memory error during execution of a run time environment within an information handling system, and determining if the memory error is a correctable memory error. The method can also include identifying a first memory location within a first memory device causing the memory error, and storing a first reference to the first memory location within a persistent memory. The method can further include disabling use of the first memory location during use of the run time environment.

18 Claims, 4 Drawing Sheets

SYSTEM AND METHOD OF IDENTIFYING AND STORING MEMORY ERROR LOCATIONS

FIELD OF THE DISCLOSURE

This disclosure relates generally to information handling systems, and more particularly to a system and method of identifying and storing system memory errors.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
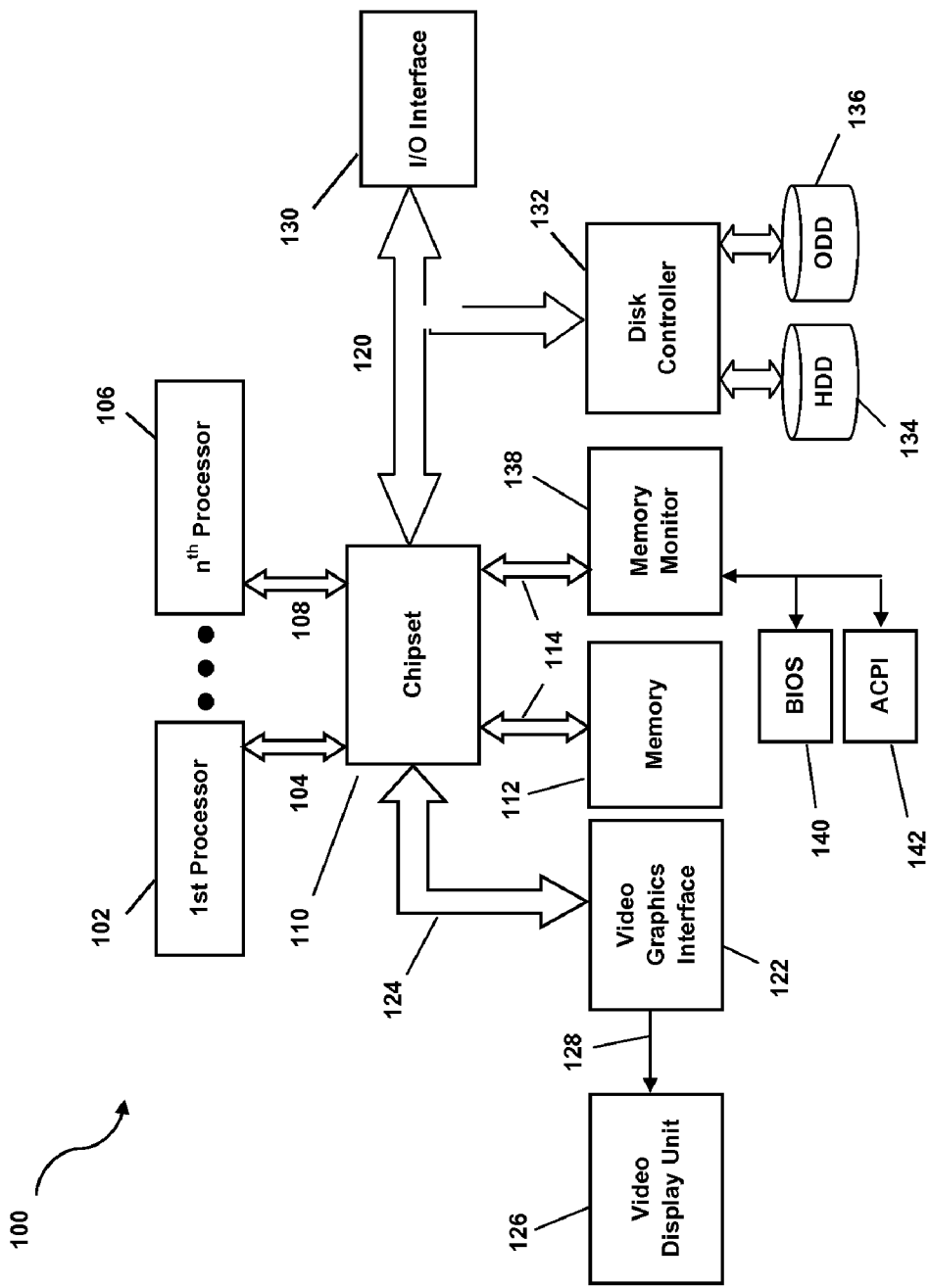
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a wireless communication device, a thin client, a diskless computer system or personal computer (PC) a network server or storage device, a switch router, wireless router, or other network communication device, or any other suitable device and can vary in size, shape, performance, functionality, and price. The information handling system can include memory, one or more processing resources such as one or more single or multiple-core central processing units (CPUs) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, a method of using a memory is disclosed. The method can include detecting a memory error during execution of a run time environment within an information handling system, and determining whether or not the memory error is a correctable memory error. The method can also include identifying a first memory location within a first memory device including the memory error, and storing a first reference to the first memory location within a persistent memory. The method can further include disabling use of the first memory location during use of the run time environment.

According to another aspect of the disclosure, and information handing system is provided. The information handling system can include a first memory device operable to include first memory location including a first memory error. The information handling system can also include a memory error detection module operable to detect the first memory error and first memory location during use of the first memory device within a run time operating environment. The information handling system can further include a processor operable to initialize the run time environment, the processor further operable to initiate disabling access to the first memory location.

According to a further aspect of the disclosure, a memory module is disclosed. The memory module can include a first volatile memory having a plurality of memory locations operable to store information, and a first identifiable memory location including a first memory error. The memory module can also include a non-volatile memory configured to store an updateable memory error reference table including a first reference to the first identifiable memory location.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as n$^{th}$ physical processor 106 coupled to a second host bus 108. The first physical processor 102 can be coupled to a chipset 110 via the first host bus 104. Further, the n$^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the n$^{th}$ physical processor 106. For example, the chipset 110 including a chipset that can include a memory controller hub and an input/output (I/O) controller hub. As a memory controller hub, the chipset 110 can function to access the first physical processor 102 using first bus 104 and the n$^{th}$ physical processor 106 using the second host bus 108. The chipset 110 can also be used as a memory interface for accessing memory 112 using a memory bus 114. In a particular embodiment, the buses 104, 108, and 114 can be individual buses or part of the same bus. The chipset 110 can also include bus control and can handle transfers between the buses 104, 108, and 114.

According to another aspect, the chipset 110 can include an application specific chipset that connects to various buses, and integrates other system functions. For example, the chipset 110 can include using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can be used as at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to content to display within a video display unit 126. Other graphics interfaces may also be used. The video graphics interface 122 can output a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit (I$^2$C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the n$^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal, external, or remote disk drives such illustrated generally as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive. In one form, the HDD 134 can be remotely located and access via a network.

The information handling system 100 can further include a basic input output system (BIOS) stored within an electrically programmable read-only memory (EPROM) device 130 that can be accessed by the first physical processor 102 during initialization, reset, rebooting, or powering up of information handling system 100. The BIOS can be provided using a BIOS input 132 to the first physical processor 102 during initialization, reboot, or start-up of the information handling system 100. In one embodiment, the n$^{th}$ processor 106 can access the BIOS 130 when needed.

Initialization of the information handling system 100 can begin with accessing the BIOS 130 using the first processor 102 of the information handling system 100. When the BIOS 130 boots up the information handling system 100, the BIOS 130 typically first determines the functionality of critical hardware components and then loads all or a portion of the operating system from a system hard disk drive, diskette drive, or optical drive. The BIOS 130 can enable an operating system and various other applications to not have to understand details, such as hardware addresses about various electronic components within the information handling system 100. For example, an operating system may not have to keep track of addressing for devices such as hard disk drives, video adapters, keyboards, pointing devices, printers, memories and other devices. As such, altering or changing an input/output device typically does not require an application or operating system to be modified in order to operate as the BIOS 130 can typically handle this function.

The information handling system 100 can also employ an Advanced Configuration and Power Interface (ACPI) module 142 in association with the BIOS 140 and memory monitor 138 to update and manage faulty memory locations. ACPI is an industry specification for the efficient handling of power consumption in desktop and mobile computers. The ACPI 142 can specify how the BIOS 140, one or more operating systems, peripheral devices, and various other components within the information handling system communicate with each other about power usage. The ACPI module 142 and the BIOS 140 can provide an operating environment, or operating system, access to directly control low-level details of hardware within the information handling system 100. In one form, the BIOS 140 can also employ a memory error reference table to manage access to memory locations of the memory device 112 or other memory modules, devices, or any combination thereof, that can be used by the information handing system 100.

During use, the BIOS 140 can access the ACPI module 142 or an associated ACPI-based memory descriptor that can be stored within a persistent memory location having one or more entries to defective memory locations. During an initialization sequence, a memory map can be generated to remove access to defective memory locations using the BIOS 140 and the ACPI module 142, while enabling access to valid or functioning memory locations. In one form, the BIOS 140 can be used to limit access to faulty memory location using a BIOS interrupt function, such as an "Int15" function "E820H", or the like, to handle removal of faulty memory locations and prevent an operating environment from utilizing faulty or defective bits. "Int15" function "E820H" includes an industry standard function and sub-function value that can be used to report a memory map or faulty memory locations. Other BIOS interrupt functions, subroutines, sub-functions, etc. can be employed as desired. In another form, ACPI descriptors can also be used to report memory map to the operating system.

According to one aspect, Unified Extensible Firmware Interface (UEFI) can also be used. For example, UEFI memory map reporting interface can be based on an interface specification detailing an interface that can relay control of the IHS 100 to pre-boot environment (i.e. after the IHS 100 has powered on, but before the operating system starts) to an operating system, such as Windows, Linux, other capable operating systems. UEFI can provide a clean interface between operating systems and platform firmware including memory map at boot time, and can support an architecture-independent mechanism for initializing modules, add-in cards, or other interface devices.

In one form, a UEFI specification can be based on an Extensible Firmware Interface EFI 1.10 specification, an UEFI 2.1 specification, UEFI 2.2 specification, published by Intel Corporation, or any future specifications or versions of specifications. In one form, corrections and changes can be managed by a Unified EFI Forum as needed or desired.

In one aspect, upon initializing the information handling system 100, the memory monitor 138 can detect a memory error of one or more memory locations within the memory 112. The error can be communicated via the BIOS 140 and the ACPI 142 to a reference list, memory map, or table, or any combination thereof, can be employed to limit access to the faulty memory location within the memory 112. For example, a memory error reference table accessible by the BIOS 140 can be updated to remove the faulty memory locations as detected by the memory monitor 138.

In another forms, the information handling system 100 can employ other interfaces or modules, or various combination thereof to identify and update faulty memory locations including, but not limited to, an extensible firmware interface (EFI), UEFI, a BIOS interface, an "int15 function E820H", ACPI memory descriptors, or various interfaces, functions, or combinations thereof.

Figure 2:
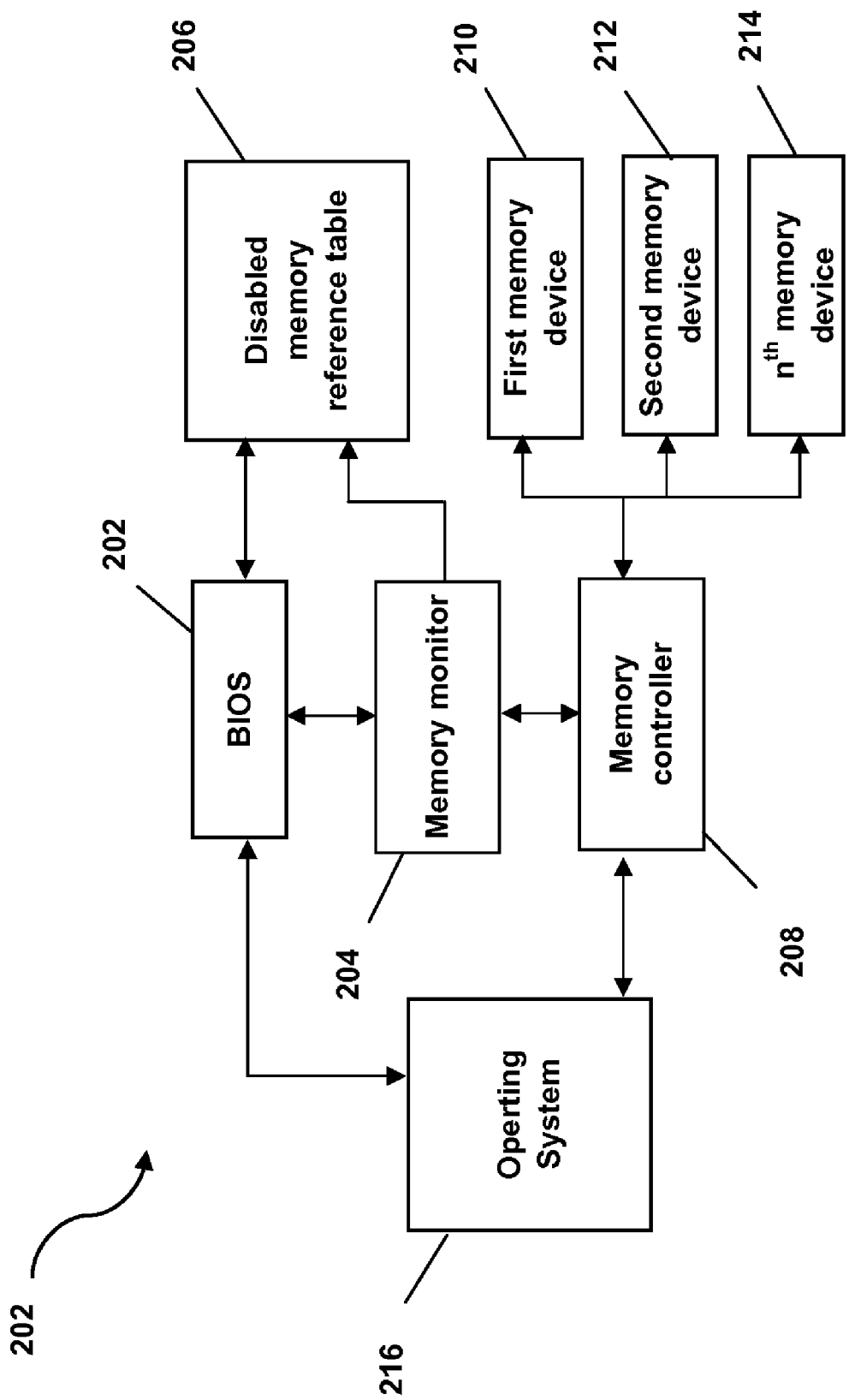
FIG. 2 illustrates a functional block diagram of a memory error identification system according to one aspect of the disclosure.

FIG. 2 illustrates a functional block diagram of a memory management system, illustrated generally at 200, operable to be employed by an information handling system such as information handling system 100 described in FIG. 1. The memory management system 200 can employ a BIOS 202 operably coupled to a memory monitor 204 and a memory error reference table 206 operable to stored one or more disabled memory location references within a storage device. The memory management system 200 can also include a memory controller 208 coupled to the memory monitor 204 and operable to control access to one or more memory devices such as a first memory device 210, a second memory device 212, an nth memory device 214 when coupled to an operating system 216.

Various amounts, sizes, and types of memory devices can be managed using memory management system 200 including, but not limited to a single in-line memory module (SIMM), a dual in-line memory module (DIMM), an ECC module, or various other types of memory modules or devices that may have faulty memory locations. Additionally, each memory device 210, 212, 214, need not be included as a memory array or module and can be coupled to the memory management system 200 as separate memory devices, a single memory device, or any combination of thereof.

According to one aspect, the BIOS 202 can be used in association with the operating system 216 and the memory error reference table 206 to disable access to faulty memory locations within each memory device 210, 212, 214. For example, the BIOS 202 can generate a memory map using the memory error reference table 206 and access to faulty memory locations can be restricted prior to the operating system 216 accessing the faulty memory locations. In this manner, memory errors that may occur during use of the one or more of the memory devices 210, 212, 214 can be obviated during use of the operating system 216.

According to another aspect, as the operating system 216 accesses one or more of the memory devices 210, 212, 214 using the memory controller 208, the memory monitor 204 can monitor errors that can occur an can update the memory error reference table 206. In this manner, the BIOS 202 can access the updated memory error reference table 206 and a memory map can be updated to disable access to the faulty memory locations by the operating system 216.

Figure 3:
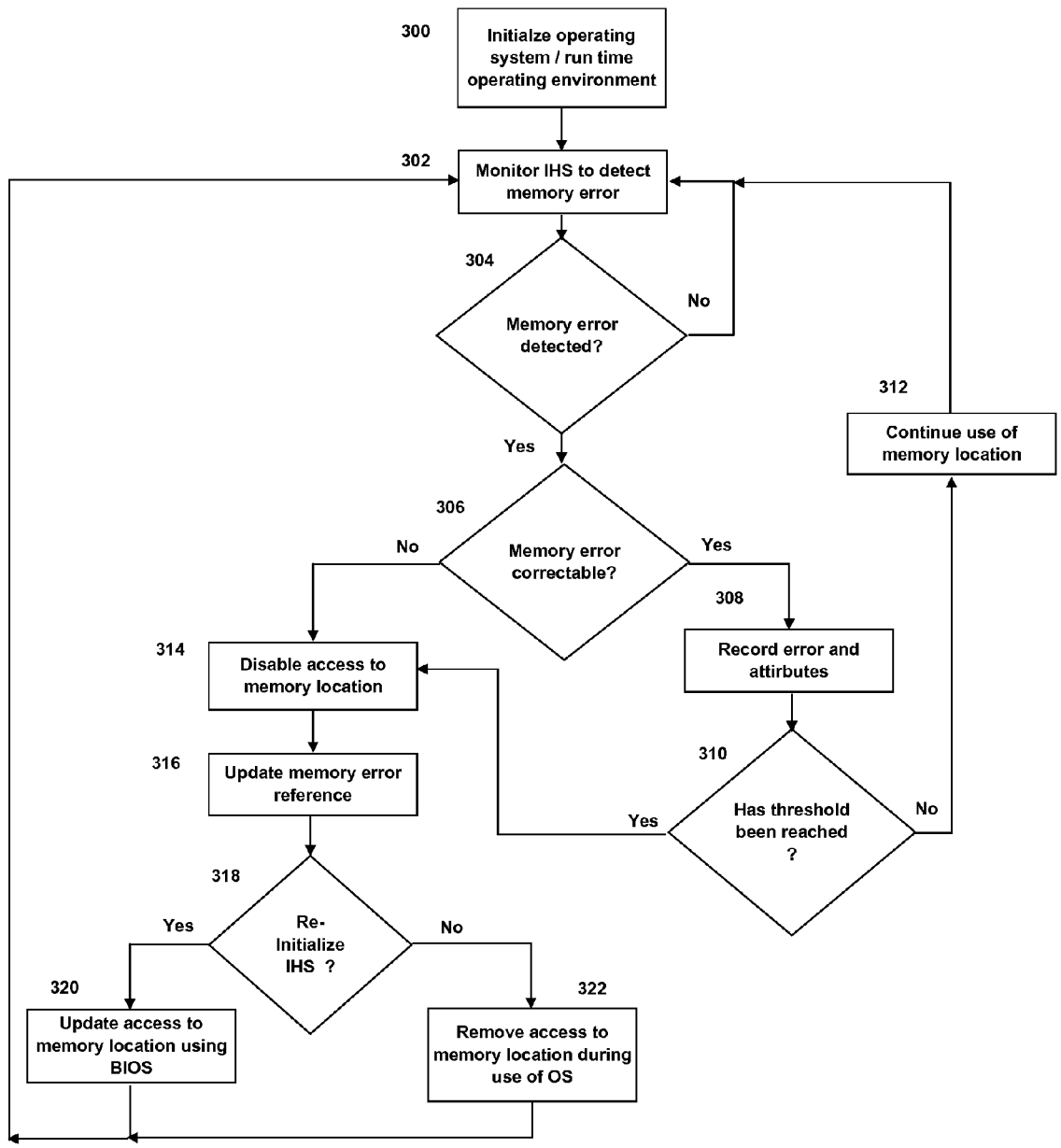
FIG. 3 illustrates a flow diagram of method of obtaining memory errors within an information handling system according to one aspect of the disclosure.

FIG. 3 illustrates a flow diagram of method of obtaining memory errors within an information handling system one aspect of the disclosure. FIG. 3 can be employed in whole, or in part, by the information handling system 100 depicted in FIG. 1, the memory management system 200 described in FIG. 2 above, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions, of the method of FIG. 3.

The method begins at block 300 as an information handling system initializes and an operating system may be loaded or a run time environment is established. For example, an operating system such as a windows operating system can be established. In other forms, a run time environment, such as media operating environment such as media direct, or other run time environments that can be used by an information handling system. Upon initialization the information handling system to a run time operating environment, the method can proceed to block 302 and a memory monitor can monitor activities within an information handling system to determine if a memory error may have occurred. For example, various error events can be monitored using, for example, an event handler or other error detecting interface, to determine if a memory error event may have been experienced by the information handling system. If a memory error is not detected at decision block 304, the can proceed to block 302 and the information handling system can continue as described.

If at decision block 304, a memory error event may be detected, the method can proceed to decision block 306 to determine if the memory error may be a correctable memory error. For example, a correctable memory error can include a single bit ECC memory error, multiple bit ECC errors in a memory when specific "chipkill", or other supported technology may be available within a DIMM and memory controller, a communication module with memory such as a PCI, PCI-Express module, or any combination thereof. In one form, a correctable memory error can be detected using a CRC based error detection. If a correctable error is determined at decision block 306, the method can proceed to block 308 and attributes, such as one or more memory locations, addresses, relative addresses, error types, number of occurrences, or various other memory error attributes or information, can be recorded. In one form, a counter counting the number of errors that may have occurred at a specific memory location can be increased.

The method can then proceed to block 310 and determines if a threshold has been reached. If a threshold has not been reached, the method can proceed to block 312 and the memory location can remain in use by the information handling system. In this manner, errors that may not be consistently occurring at a memory location (e.g. a "hard failure", "consistent failure", etc.) can be reused. In this manner, transient errors that may be caused by other factors within an information handling system may not influence identifying faulty memory locations. If at decision block 310, a threshold has been achieved, the method can proceed to block 314 as described below.

In one form, if at decision block 306, the memory error may not be correctable, the method can proceed to block 314, and the one or more memory locations having the error can be disabled and the method can proceed to block 316 and a reference to the faulty memory location can be stored within a memory. For example, the reference can be stored within reference table of memory device within an ECC, DIMM, or other memory module including persistent memory operable to store faulty memory locations. In another forms, references to faulty memory locations can be stored within a storage device, such as a disk drive, flash drive, EEPROM, EPROM, a BIOS EPROM, or various other persistent memory locations that can be employed, to store references that can be used to identify faulty memory locations.

Upon storing a reference to the faulty memory location, the method can proceed to block 318 and determine if the information handling system should be re-initialized. For example, in one form, the BIOS or other interface operable to limit access to specific memory locations of memory used within an information handling system can be used to disable one or more memory locations. As such, the information handling system can be reinitialized, and the method can proceed to block 320 and the BIOS can update access to memory locations.

In another form, at decision block 318, the information handling system may not need to be reinitialized. As such, a reference to the memory location can be employed by the operating system or other operating environment, and access to the memory location can be removed. According to one aspect, an operating system can employ a routine or other form of chipset accessible routine or firmware that can update faulty memory locations in near real time during use of the operating system. The method can then proceed to block 302 and repeats.

Figure 4:
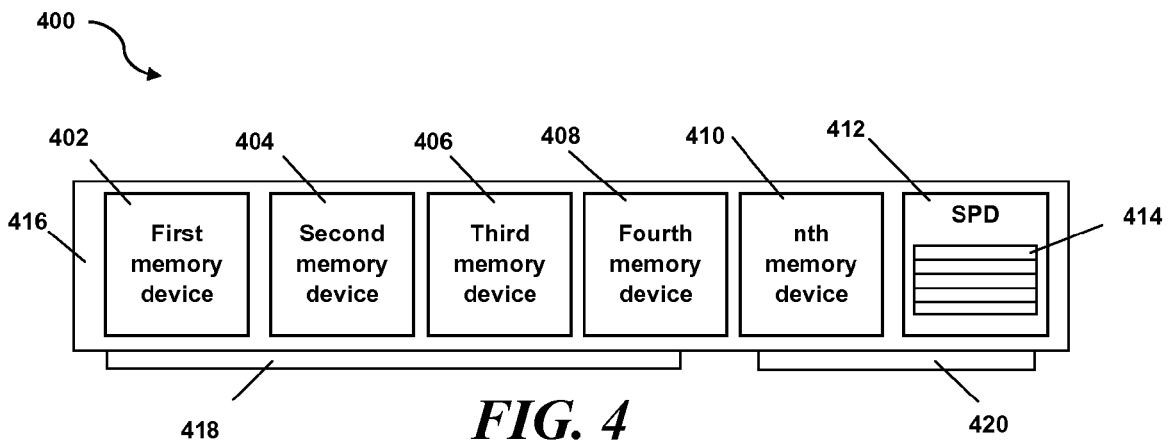
FIG. 4 illustrates a diagram of a memory module according to one aspect of the disclosure.

FIG. 4 illustrates a diagram of a memory module, illustrated generally at 400, and operable to limit access to memory locations within one or more memory devices or RAM devices of the memory module. The memory module 400 can be used with the information handling system 100 illustrated in FIG. 1 and can be updated with one or more reference detected by the information handling system 100 as being faulty memory addresses.

According to one aspect, the memory module 400 can include a first memory device 402, a second memory device 404, a third memory device 406, a fourth memory device 408, and an $n^{th}$ memory device 410. The memory module 400 can include various types of memory modules including a SIMM, a DIMM, an ECC DIMM, or any combination thereof. For example, the memory module 400 including a DIMM can include one or more random access memory (RAM) devices as memory devices 402, 404, 406, 408, 410 coupled to a circuit board using first interface 418 and second interface 420 operable to be coupled to a main board of an information handling system. The memory module 400 including a DIMM can employ a 168-pin interface operable to support a 64-bit data transfer. In another form, the memory module 400 can include a SIMM that typically has a 32 data bit paths and can employ a 72-pin connector. Synchronous dynamic RAM (SDRAM) memory devices can also be used with the memory module 400, which have a 64 data bit paths.

In one form, an Error Correcting Code (ECC) can be used within a memory module or memory device. For example, a DIMM module can be configured to provide seventy-two (72) data bits. In one form, sixty-four (64) bits can be used for actual data, and 8 bits for ECC data. During each memory transaction, an ECC code can be generated and transferred by a memory controller of the DIMM to indicate an error status or other type of error information associated with the transaction.

According to one aspect, the memory module 400 can also include an serial presence detect module (SPD) 412 that can include a 256 byte serial EEPROM with a Joint Electron Device Engineering Council (JEDEC) defined data format that can be used to provide the characteristics of the DIMM module. For example, the JEDEC data can include manufacturer data, date code data, timing parameters, etc. Additionally, other persistent memory sizes can also be employed. In one form, a JEDEC defined data can also include a customer use area set of bytes that can be used within a platform. The memory module 400 can also include a persistent memory 414 configured to store references to one or more faulty memory locations that can be detected by an information handling system. For example, the persistent memory 414 can be updated by an information handling system detecting one more faulty memory locations within one of the memory devices of the memory module 410. The persistent memory 414 can be updated with one or more reference to faulty memory locations that can be detected by the information handling system and access can be limited during use. A first and second output terminal operable to be coupled to a main circuit board of an information handling system such as information handling system 100 illustrated in FIG. 1.

Figure 5:
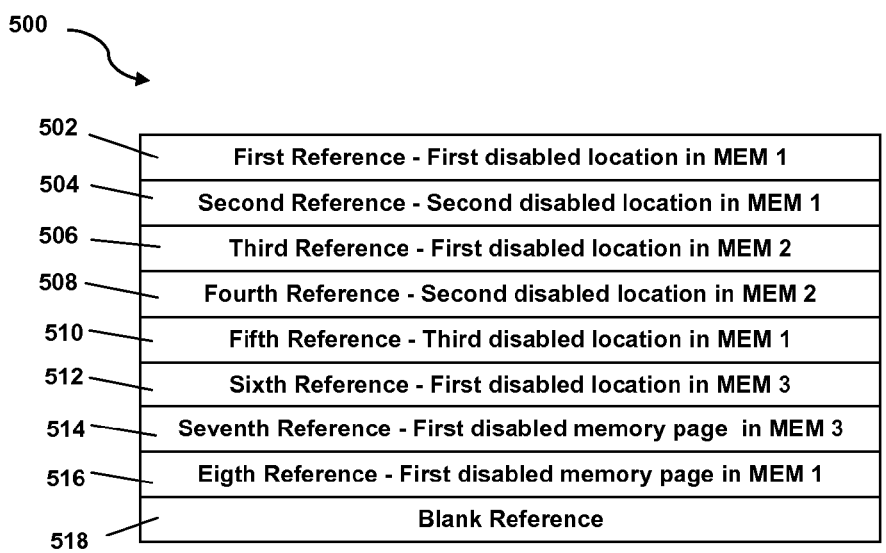
FIG. 5 illustrates a diagram of locations within a memory device according one aspect of the disclosure.

FIG. 5 illustrates a functional block diagram of updateable memory references, illustrated generally at 500 that can be used in association with the memory module 400 illustrated in FIG. 4. The updateable memory references 500 can include a first reference entry 502 to a first disabled memory location within a first memory device, and a second reference entry 504 to a disabled memory location within the first memory device. The updateable memory references 500 can also include a third reference entry 506 to an first disabled memory location within a second memory device, and a fourth reference entry 508 to a second disabled memory location within the second memory device. The updateable memory references 500 can also include a fifth reference entry 510 to a third disabled memory location within the first memory device.

The updateable memory references 500 can also include a sixth reference entry 512 to a first disabled memory location within a third memory device, and a seventh reference entry 514 to a first disabled memory page within the third memory device. In one form, a memory page can include a block of memory having various sizes (e.g. page size 1, page size 2), and provided as contiguous, non-contiguous, or any combination thereof. The updateable memory references 500 can further include an eighth reference entry 516 to a first disabled memory page within the first memory, and one or more blank reference entries 518 operable to be updated as additional faulty memory locations may be identified.

During use, an information handling system can access the updateable memory references 500 including one or more faulty memory locations during an initialization routine of an information handling system to limit access to various portions of one or more memory device. For example, a BIOS of an information handling system can access a memory map of the information handling system to restrict access to faulty memory locations. In one form, a memory map can include direct addressing, relative addressing, or any combination thereof, to access a memory addresses within memory devices and memory modules of an information handling system. In this manner, one or more reference to one or more faulty memory locations can be stored and accessed to limit access to the memory locations during use of an information handling system. As such, a memory module or memory device including faulty memory locations need not be removed and replaced in the event of failure. Additionally, a real time updating of faulty memory locations can be generated to ensure valid or functional memory locations are used by an information handling system.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of using a memory comprising:
detecting a memory error during execution of a run time environment within an information handling system;
determining whether or not the memory error is a correctable memory error;
identifying a first memory location within a first memory device including the memory error;
storing a first reference to the first memory location within a persistent memory;
disabling use of the first memory location during use of the run time environment;
storing the first reference within a persistent memory of a memory module;
enabling access to the first reference during an initialization of the information handling system;
accessing the first reference using a BIOS of the information handling system; and
generating a memory map that excludes access to the first memory location within the first memory device.

2. The method of claim 1, further comprising:
storing the first reference remote to the first memory; and
accessing the first reference during an initialization of the information handling system.

3. The method of claim 1, further comprising:
receiving a detection of the memory error from an error handler of the information handling system;
determining whether or not the memory error reoccurs; and
enabling storage of the first reference in response to the memory error reoccurring.

4. The method of claim 1, further comprising:
detecting a plurality of memory errors of the first memory;
determining a number of memory locations of the plurality of memory errors; and
disabling access to the number of memory locations.

5. The method of claim 4, further comprising:
determining a range of memory locations including the plurality of errors;
detecting a second memory error of a second memory location not included within the range of memory locations; and
enabling use of the second memory location.

6. The method of claim 5, further comprising:
detecting a third memory error at the second memory location;
disabling access to the second memory location in response to detecting the third memory error; and
storing a second reference to the second memory location within the persistent memory device.

7. The method of claim 5, further comprising:
detecting a second plurality of errors within the first memory;
detecting at least one memory error of the second plurality of errors located within a second range of memory locations;
disabling access to the second range of memory locations in response detecting the second plurality of errors; and
updating a memory error reference table to include at least one reference to the second range of memory locations.

8. The method of claim 1, further comprising:
updating a memory error reference table to disable access to the first memory location;
disabling an operating system access to the first memory location; and
continuing use of an operating system upon disabling access to the first memory location.

9. The method of claim 1, further comprising:
updating a memory error reference table to include the first reference to first memory location;
reinitializing the information handling system;
disabling access to the first memory location during the reinitializing;
generating a memory map identifying the disabled first memory location; and
enabling use of the memory map during use of an operating system of the run time environment.

10. An information handing system comprising:
a first memory device operable to include first memory location including a first memory error;
a memory error detection module operable to detect the first memory error and first memory location during use of the first memory device within a run time operating environment;
a processor operable to initialize the run time environment, the processor further operable to initiate disabling access to the first memory location; and
a BIOS operable to be used with the processor to disable access to the first memory location during an initialization sequence.

11. The information handing system of claim 10, further comprising a memory error reference table operably configured to be updated by the BIOS in response to detecting the first memory error.

12. The information handing system of claim 10, further comprising a removable memory module including:
    the first memory device operable to include a first memory location including the first memory error;
    a second memory device operable to include a second memory location including a second memory error;
    a non-volatile memory operable to store a memory error reference table, wherein the memory error reference table is operable to include:
        a first reference to the first memory location; and
        a second reference to the second memory location.

13. The information handing system of claim 10, further comprising an UEFI memory map reporting interface operable to be used in association with disabling access to the first memory location.

14. The information handing system of claim 12, further comprising the first memory error reference table operable to be updated to include the second reference during execution of the run time operating environment.

15. A memory module comprising:
    a first volatile memory including:
        a plurality of memory locations operable to store information; and
        a first identifiable memory location including a first memory error; and
    a non-volatile memory configured to store an updateable memory error reference table including a first reference to the first identifiable memory location,
    wherein access to the first identifiable memory location is disabled by a BIOS during an initialization sequence.

16. The memory module of claims 15, wherein the updateable memory error reference table is further configured to be accessed during an initialization of an information handling system to disable access to the first identifiable memory location during a run time environment of the information handling system.

17. The memory module of claim 16, further comprising:
    a dual input memory module (DIMM) including:
        the first volatile memory;
        a second volatile memory device including:
            a second plurality of memory locations operable to store information; and
            a second identifiable memory location including a second memory error; and
        a serial presence detect module including the non-volatile memory configured to store the updateable memory error reference table, wherein the updateable memory reference table includes:
            a first reference to the first identifiable memory location; and
            a second reference the second identifiable memory location.

18. An information handing system comprising:
    a first memory device operable to include first memory location including a first memory error;
    a memory error detection module operable to detect the first memory error and first memory location during use of the first memory device within a run time operating environment;
    a processor operable to initialize the run time environment, the processor further operable to initiate disabling access to the first memory location; and
    a memory error reference table operably configured to be updated by a BIOS in response to detecting the first memory error.

* * * * *